(12) United States Patent
Hu (10) Patent No.: US 12,492,523 B2
(45) Date of Patent: Dec. 9, 2025

(54) WASHING AND DESALINATING SYSTEM FOR SAND SOIL IN RIVER MOUTH BLOWING-SAND RECLAIMED LAND BEFORE PLANTING GREENERY

(71) Applicants: China Three Gorges Corporation, Wuhan (CN); Shanghai Investigation, Design & Research Institute Co., Ltd., Shanghai (CN)

(72) Inventor: Wei Hu, Wuhan (CN)

(73) Assignees: China Three Gorges Corporation, Wuhan (CN); Shanghai Investigation, Design & Research Institute Co., Ltd., Shanghai (CN)

( * ) Notice: Subject to any disclaimer, the term of this patent is extended or adjusted under 35 U.S.C. 154(b) by 120 days.

(21) Appl. No.: 18/585,107

(22) Filed: Feb. 23, 2024

(65) Prior Publication Data

US 2024/0342629 A1    Oct. 17, 2024

(30) Foreign Application Priority Data

Feb. 24, 2023   (CN) .......................... 202310161291.1
Feb. 24, 2023   (CN) .......................... 202310161293.0
Feb. 24, 2023   (CN) .......................... 202310161295.X (51) Int. Cl.
| | |
|---|---|
| *E02B 1/00* | (2006.01) |
| *B09C 1/02* | (2006.01) |
| *E02B 3/10* | (2006.01) |
| *E02B 3/18* | (2006.01) |

(52) U.S. Cl.
CPC ............... *E02B 1/003* (2013.01); *B09C 1/02* (2013.01); *E02B 3/10* (2013.01); *E02B 3/18* (2013.01)

(58) Field of Classification Search
CPC ... E02B 1/003; E02B 3/10; E02B 3/18; B09C 1/02
See application file for complete search history.

(56) References Cited

U.S. PATENT DOCUMENTS 5,454,668 A * 10/1995  Liao .......................... E02B 7/06
                                                                405/117

FOREIGN PATENT DOCUMENTS

| CN | 1865170    A | * | 11/2006 | |
|---|---|---|---|---|
| CN | 1900426    A | * | 1/2007 | |
| CN | 208532388  U | * | 2/2019 | |
| CN | 109906920  A | * | 6/2019 | |
| CN | 110241781  A | * | 9/2019 | ............... E02B 3/12 |

(Continued)

*Primary Examiner* — Frederick L Lagman
(74) *Attorney, Agent, or Firm* — IPRTOP LLC (57) ABSTRACT

A leaching and desalinating system for sandy soil in estuarine land reclaimed by sand blowing before planting greenery is provided. The leaching and desalinating system comprises a water pump and pipe assembly, a freshwater storage tank and a main diverting and draining channel. The water pump and pipe assembly lifts freshwater from a river to the freshwater storage tank through a water delivery pipe, multiple infiltration parts in which greenery is planted are provided on the waterside slope, the infiltration parts are connected to each other via multiple drainage infiltration channels. The present disclosure can quickly desalinate the sandy soil in land reclaimed by sand blowing at a low cost, improve the physicochemical properties of the soil, and provide a basic guarantee for the subsequent greenery planting on the sandy soil in land reclaimed by sand blowing.

18 Claims, 4 Drawing Sheets

(56) References Cited

FOREIGN PATENT DOCUMENTS

CN          209732191 U  *  12/2019
KR      20140005836 A  *   1/2014  ............... E02B 3/18

\* cited by examiner

WASHING AND DESALINATING SYSTEM FOR SAND SOIL IN RIVER MOUTH BLOWING-SAND RECLAIMED LAND BEFORE PLANTING GREENERY

TECHNICAL FIELD

The present disclosure relates to the technical field of ecological and environmental engineering, and particularly relates to a leaching and desalinating system and method for sandy soil in estuarine land reclaimed by sand blowing before planting greenery.

BACKGROUND OF THE INVENTION

Levee construction by sand blowing includes blowing sand from the material field directly to the filling point using high-pressure centrifugal pumps, discharging the pore water from the sand quickly after vibration compaction, so that a solid levee is formed. Alternatively, the sand blown to the filling point may serve as a core and clay is used to cover and seal the sand, thereby forming the levee. The latter method combines the advantages of both sand and clay, effectively avoiding slip and slump caused by the water loss in the sand, difficult compaction, poor dry stability, and the like.

Although sand blowing can reduce investment, shorten the construction period, ensure quality, and achieve good results, the process of sand blowing destroys the soil structure and results in high chlorine content, high saline content, and low organic matter content, making it difficult for vegetation to grow. Therefore, it is necessary to take measures to reduce the salinity of the soil and improve the physical and chemical properties of the soil, so as to provide the prerequisites for the subsequent plantation and regeneration of greenery.

In the traditional measures, dissolution and desalination of salt were performed artificially until reaching the expected goal, then pit digging, soil replacement, planting, and other processes were performed according to the subsequent to-be-planted species and plantation layout, however, these kinds of non-differentiated treatments of the whole area is not economical, takes a long time to accomplish desalination and see the results, and requires a second construction, which is not conducive to the project schedule and investment control. Therefore, there is an urgent need to develop a technology that is low-cost and achieves rapid desalination and soil improvement.

SUMMARY OF THE INVENTION

In view of the defects of the above existing technology, the present disclosure provides a leaching and desalinating system and method for sandy soil in estuarine land reclaimed by sand blowing before planting greenery. The present disclosure can quickly desalinate the sandy soil in land reclaimed by sand blowing at a low cost, improve the physicochemical properties of the soil, and provide a basic guarantee for the subsequent greenery planting on the sandy soil in land reclaimed by sand blowing. In addition, the present disclosure has minimal disturbance during the construction for greenery planting, which is conducive to steady improvements of the physical and chemical properties of the soil in the planting areas and ensures a good effect.

The technical solution is as follows.

A leaching and desalinating system for sandy soil in estuarine land reclaimed by sand blowing before planting greenery is provided. A levee formed by sand blowing is located on a side of a river (a man-made waterway constructed close to the levee), one slope of the levee closer to the river is a waterside slope, and the other slope of the levee is a landside slope. The leaching and desalinating system comprises a water pump and pipe assembly arranged in the river, a freshwater storage tank and a main diverting and draining channel arranged at a top of the levee. The water pump and pipe assembly lifts freshwater from the river to the freshwater storage tank through a water delivery pipe, multiple infiltration parts in which greenery is planted are provided on the waterside slope, the infiltration parts are connected to each other via multiple drainage infiltration channels, of the drainage infiltration channels, those closer to the main diverting and draining channel are connected to the main diverting and draining channel, and those closer to the river are connected to the river.

Further, the water delivery pipe is arranged along a surface of the waterside slope, or the water delivery pipe is buried in an excavated pipe trench in the levee.

Further, the water delivery pipe is connected to the infiltration parts and the drainage infiltration channels through multiple bypass pipes, and the mouth of each of the bypass pipes is provided with a geotextile.

Further, the main diverting and draining channel is excavated along an extension direction of the levee, an infiltration drainage piece is arranged inside the main diverting and draining channel, and a bottom of the infiltration drainage piece is lower than a bottom of the freshwater storage tank.

Further, multiple infiltration hollows with different sizes are formed in the infiltration parts according to the types of greenery to be planted subsequently, a bottom of each of the infiltration hollows is covered by a layer of gravel, or a bottom of each of the infiltration hollows is inserted with an infiltration drainage piece or a drainage panel for increasing a pore size of the sandy soil.

Further, a top edge of each of the infiltration hollows is located on a slope surface of the waterside slope, and soil is piled upwardly or a water-guiding board is arranged at a lower side of the top edge of each of the infiltration hollows, so as to form an infiltration area.

Further, an inclined angle of some of the drainage infiltration channels away from the river is smaller than that of the waterside slope.

Further, the side walls of the freshwater storage tank are provided with impermeable layers within a certain height range; the water pump and pipe assembly includes a water pump, a pump head of the water pump is below a water surface of the river and on a side of the river away from the levee; and the waterside slope is provided with a pavement.

A construction method for leaching and desalinating sandy soil in estuarine land reclaimed by sand blowing and planting greenery is provided. The construction method comprises: S1 construction for leaching and desalination and S2 construction for greenery planting.

Step S1 comprises the following substeps:
S1-1 forming multiple freshwater storage tanks by excavation at a top of a levee formed by blowing sand, then forming a main diverting and draining channel connected to the freshwater storage tanks by excavation;
S1-2 forming multiple drainage infiltration channels by excavation on a waterside slope of the levee, and forming multiple infiltration hollows by excavation, wherein the infiltration hollows are connected to each other by the drainage infiltration channels, and those of the infiltration hollows closer to the main diverting and draining channel are connected to the main diverting and draining channel;

S1-3 installing a water pump and pipe assembly in a river for lifting the freshwater in the river through a water delivery pipe into the freshwater storage tanks.

Step S2 comprises performing leaching and desalinating on the sandy soil of the levee using the leaching and desalinating system formed in the construction for leaching and desalination, and planting greenery in the infiltration hollows and the freshwater storage tanks.

Further, step S1-1 comprises: determining positions of the freshwater storage tanks at the top of the levee according to a subsequent greenery planting layout, excavating the freshwater storage tanks with different sizes according to different varieties of to-be-planted greenery, arranging the freshwater storage tanks in series along an extension direction of the levee, excavating the main diverting and draining channel at the top of the levee near the waterside slope along the extension direction of the levee, and then connecting the main diverting and draining channel to one freshwater storage tank.

Further, in step S1-1, the freshwater storage tanks are arranged side by side along the extension direction of the levee. If the main diverting and draining channel coincides with and matches a rainwater channel in size, wherein the rainwater channel is constructed at the top of the levee during the construction for greenery planting, a depth of the main diverting and draining channel and a width of the opening of the main diverting and draining channel are set to design values, if the main diverting and draining channel does not coincide with and match the rainwater channel in size, the depth of the main diverting and draining channel and the width of the openings of the main diverting and draining channel are not set to design values.

Further, in step S1-2, the drainage infiltration channels 11 are excavated sequentially in a direction from the top to the bottom of the levee, excavation locations of the infiltration hollows on the waterside slope are determined according to a subsequent greenery planting layout, the infiltration hollows with different sizes are excavated according to the varieties of the greenery to be planted therein during the construction for greenery planting, and the infiltration hollows are excavated sequentially in a direction from the bottom to the top of the levee.

Further, if greenery with lateral root growth is planted in the freshwater storage tanks or infiltration hollows during the construction for greenery planting, the freshwater storage tanks or infiltration hollows are excavated to a first set depth and then to a second set depth during the construction for leaching and desalination, gravels (8) are provided within the height difference between the first set depth and the second set depth.

If greenery with longitudinal root growth is planted in the freshwater storage tanks or infiltration hollows during the construction for greenery planting, the freshwater storage tanks or infiltration hollows are excavated to a set depth during the construction for leaching and desalination, and then drainage panels are buried at the bottom of the freshwater storage tanks or infiltration hollows to increase a pore size of the sandy soil at the bottom of the freshwater storage tanks or infiltration hollows.

Further, in step S1-2, multiple scale ripples are provided on the waterside slope, and sand excavated from each of the scale ripples is piled up at a lower edge of each of the scale ripples to form a sand barricade, and a pavement is provided on the waterside slope.

Further, in step S2, during the construction for greenery planting, the infiltration hollows are first filled with planting soil, then the planting soil is compacted, and corresponding varieties of greenery are planted in the infiltration hollows according to different treatments at the bottom of the infiltration hollows. Some of the scale ripples are filled with humus soil in which seeds are sowed or lawns are transplanted; gaps between the stones of the pavement are provided with herbaceous green plants. The freshwater storage tanks are first filled with the planting soil, then the planting soil is compacted, and corresponding varieties of greenery are planted in the freshwater storage tanks according to different treatments at the bottom of the freshwater storage tanks. Planting for the infiltration hollows and the some of the scale ripples is carried out sequentially from the bottom to the top of the levee.

Further, in step S1-1, an anti-seepage treatment is carried out within a certain height range on the side walls of the freshwater storage tanks.

In step S1-3, a water delivery pipe is connected to the infiltration hollows and the drainage infiltration channels via multiple bypass pipes, and one geotextile is provided at the mouth of each bypass pipe.

A method for leaching and desalinating sandy soil in estuarine land reclaimed by sand blowing before planting greenery, which uses the leaching and desalinating system for sandy soil in estuarine land reclaimed by sand blowing before planting greenery, and comprises: using a water pump and pipe assembly in a river to lift the freshwater through a water delivery pipe to multiple freshwater storage tanks at a top of a levee, wherein the freshwater in the freshwater storage tanks flows to a main diverting and draining channel by gravity, then flows to multiple infiltration parts through multiple drainage infiltration channels by gravity, and finally flows to the river, so that sandy soil in each of the infiltration parts is rapidly desalted by the freshwater; wherein the main diverting and draining channel is at the top of the levee and connected to the freshwater storage tanks; the infiltration parts are provided on a waterside slope, configured to accommodate greenery, and connected to each other through the drainage infiltration channels; and those of the drainage infiltration channels closer to the main diverting and draining channel is connected to the main diverting and draining channel, and those closer to the river is connected to the river.

Further, the method also comprises the following: rainwater falling into the freshwater storage tanks flows to the main diverting and draining channel by gravity, and then flows to the infiltration parts through the drainage infiltration channels by gravity, finally flows to the river, so that sandy soil in each infiltration parts is rapidly desalted by the rainwater.

The present disclosure has the following beneficial effects.

In the present disclosure, during the construction for leaching and desalination, when employing the leaching and desalinating system for sandy soil in estuarine land reclaimed by sand blowing before planting greenery, the water pump and pipe assembly lifts the freshwater from the river to the freshwater storage tank through a water delivery pipe, the rainwater also falls into the freshwater storage tank and main diverting and draining channel, therefore, the freshwater or rainwater in the freshwater storage tank flows to the main diverting and draining channel by gravity, then flows to the infiltration parts through the drainage infiltration channel by gravity, and finally flows to the river, so that sandy soil in each infiltration parts is rapidly desalted by the freshwater or rainwater. The freshwater storage tank, the main diverting and draining channel, the infiltration part, and the drainage infiltration channel of the present disclosure can intercept the natural rainfall, therefore, compared with a natural slope without treatments, the present disclosure can effectively utilize the infiltration of rainfall to improve the sandy soil desalination efficiency to the levee. On the other hand, the freshwater in the river lifted through the water pump to the freshwater storage tank at the top of the levee, can flow relying on gravity, therefore, compared with conventional surface spraying, erosion ditches are less prone to be formed, no manual movement and spraying intensity control is needed. In addition, in the present invention, the freshwater or rainwater in the freshwater storage tank flows along a designated route, allowing the salts in the surface soil along the designated route to infiltrate deeper to realize the purpose of desalinization. The present disclosure focuses on the leaching and desalinating of sandy soil in the freshwater storage tank and infiltration parts, where the freshwater storage tank and infiltration parts are for planting greenery. The arrangement of the freshwater storage tank, the main diverting and draining channel, the infiltration part, and the drainage infiltration channel increases the vertical infiltration rate and enlarges the infiltration area, and there is no mandatory waterproofing requirement for the main diverting and draining channel and the drainage infiltration channel, allowing for desalination effect both in a vertical direction and a transverse direction, and the desalination effect in particular is better.

In the present disclosure, the bottom of each infiltration hollow at the infiltration parts is provided with a layer of gravel, or the bottom of each infiltration hollow is inserted with an infiltration drainage piece or a drainage panel for increasing the pore size of the sandy soil at the bottom of the infiltration hollow. In this way, natural rainwater as well as the freshwater lifted by the water pump and pipe assembly can flow down into the sandy soil at the bottom of the infiltration hollow via the gaps and pores between the gravel, in addition, the gravel can play a role in enhancing the stability of slopes and preventing the sand from forming a vertical salt uprise route. The infiltration drainage piece or drainage panel can increase a pore size of the sandy soil at the bottom of the infiltration hollow, so as to magnify the infiltration and desalination effect of the naturally falling rainwater and the freshwater lifted by the water pump and pipe assembly.

The present disclosure can be organically combined with the subsequent greenery planting project, and each infiltration hollow in the present disclosure serves as a planting pit after the construction for leaching and desalination. The method for leaching and desalinating sandy soil in estuarine land reclaimed by sand blowing before planting greenery in the present disclosure is a pre-treatment suitable for the levee whose soil structure is destroyed or whose aluminum and magnesium ion content is high. The present disclosure can quickly desalinate the sandy soil in estuarine land reclaimed by sand blowing at a low cost, improve the physicochemical properties of the soil, and provide a basic guarantee for the subsequent greenery planting on the sandy soil in estuarine land reclaimed by sand blowing.

The present disclosure can be organically combined with the subsequent greenery planting project; the areas in which greenery is planted, such as the freshwater storage tank and infiltration hollow, are washed and desalted during the construction for leaching and desalination, which can reduce the salinity of the greenery planting areas, thus facilitating the plant growth, increasing the plant survival rates, and forming good planting areas.

Compared with the traditional construction method where the construction for leaching and desalination and the construction for greenery planting are separate, the present disclosure considers the construction for leaching and desalination and the construction for greenery planting as a whole, having obvious advantages in the length of the total construction period, project progress, and cost control.

The construction method combining the construction for leaching and desalination and the construction for greenery planting in the present disclosure is particularly suitable for the levee whose soil structure is destroyed or whose aluminum and magnesium ion content is high. The present disclosure comprehensively takes into consideration the on-site construction difficulty, construction convenience, construction progress, construction funds, and other factors, therefore, the present disclosure has wide applicability, and minimal disturbance during the construction for greenery planting, which is conducive to steady improvements of the physical and chemical properties of the soil in the planting areas and ensures good greening effect.

REFERENCE NUMERALS

1 River
2 Water Pump
3 Water Delivery Pipe
4 Waterside Slope
5 Main Diverting and Draining Channel
6 Freshwater storage tank
7 Infiltration Hollow
8 Gravel
9 Tree
10 Shrub
11 Drainage Infiltration Channel
12 Landside Slope
13 Pavement
14 Levee 15 Sand Barricade
16 Drainage Panel

DETAILED DESCRIPTION OF THE INVENTION

Specific embodiments of the present disclosure are described in further detail below in conjunction with the accompanying drawings. These embodiments are used only to illustrate the present disclosure and are not intended to limit the present disclosure.

In the description of the present disclosure, it is to be noted that the terms such as "center", "longitudinal", "lateral", "up", "low", "front", "back", "left", "right", "vertical", "horizontal", "top", "bottom" "inside", "outside", etc. indicate orientations or positional relationships that are based on those shown in the accompanying drawings, and are intended only to facilitate and simplify the description of the present disclosure. These terms do not indicate or imply that the device or element referred to must have a particular orientation, be constructed and operated in a particular orientation, and therefore should not be construed as a limitation of the present disclosure. Furthermore, the terms "first" and "second" are used for descriptive purposes only and should not be understood as indicating or implying relative importance.

In the description of the present disclosure, it is to be noted that, unless otherwise expressly specified and limited, the terms "mounted", "attached" and "connected" should be understood in a broad sense, e.g., it may be a fixed connection, a detachable connection, or a one-piece connection; or it may be a mechanical connection, or an electrical connection; or it may be a direct connection, or an indirect connection through an intermediate medium; or two elements may be communicated. For those of ordinary skill in the art, the specific meanings of the above terms in the present disclosure may be understood case-by-case.

Furthermore, in the description of the present disclosure, unless otherwise indicated, "a plurality of" means two or more.

Figure 6:
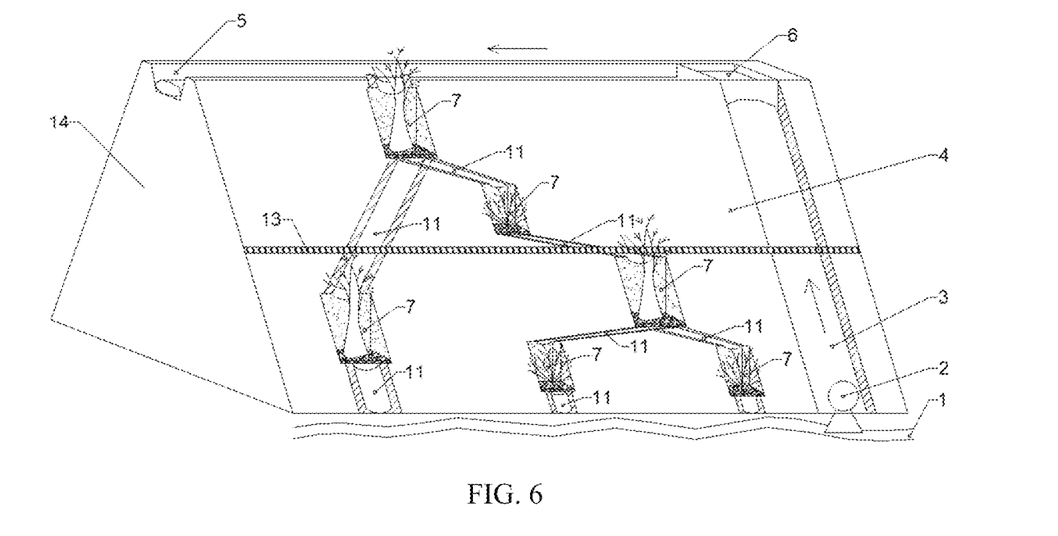
FIG. 6 shows a schematic three-dimensional structure of a levee after planting greenery, where desalination and soil improvement has been completed by the leaching and desalinating system for sandy soil in estuarine land reclaimed by sand blowing before planting greenery.
Figure 7:
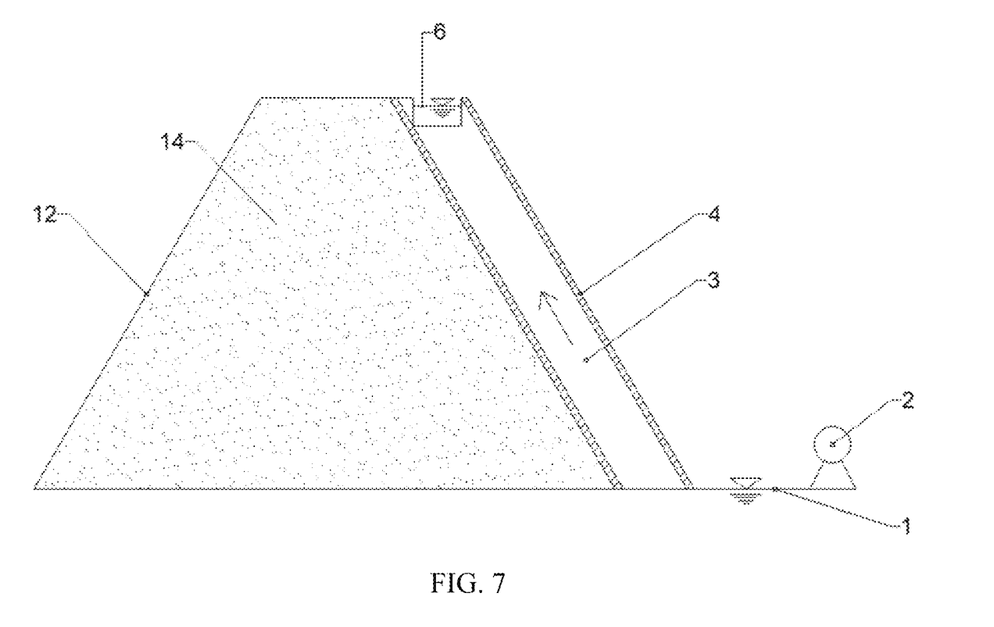
FIG. 7 shows a side view structure of FIG. 6.

FIGS. 6 and 7 show a leaching and desalinating system for sandy soil in estuarine land reclaimed by sand blowing before planting greenery, a levee 14 formed from sand blowing is on one side of a river 1, one slope of the levee 14 closer to the river 1 is a waterside slope 4, and the other slope further away from the river 1 is a landside slope 12. The leaching and desalinating system includes a water pump and pipe assembly set inside the river 1, where the water pump and pipe assembly includes a water pump 2. A top end of the levee 14 is provided with a freshwater storage tank 6 and a main diverting and draining channel 5 that are connected to each other. The water pump 2 is used to lift the freshwater in the river 1 to the freshwater storage tank 6 via a water delivery pipe 3. The waterside slope 4 is provided with multiple infiltration parts for subsequent greenery planting, where the infiltration parts are connected to each other via drainage infiltration channels 11, those of the drainage infiltration channels 11 closer to the main diverting and draining channel 5 are connected to the main diverting and draining channel 5, and those closer to the river 1 are connected to the river 1. The waterside slope 4 is provided with a pavement 13, and preferably, the pavement 13 is elevated or paved on the waterside slope.

Taking into account the electricity consumption and land use in the actual situation, the water pump 2 can be arranged on one side of the river 1, which is shown in FIG. 7, and the water pump 2 is a permanent or temporary water pump; preferably, the pump head of the water pump is located 30 cm below the water surface of the river 1 on the side of the river 1 away from the levee 14, and the head (the maximum height that the pump can raise water against gravity) of the water pump is not less than 1.2 times of the difference in height from the lowest water level of the river 1 to the top of the levee 14. In addition, taking into account the volume of the freshwater storage tank 6 and the effect of flushing and pouring, a water pump with a small flow rate as well as a long operation time can be used.

The water delivery pipe 3 is arranged along a surface of the waterside slope 4, or the water delivery pipe 3 is buried in an excavated pipe trench in the levee 14, where the water delivery pipe 3 can be selected according to the type of the water pump 2, the power, the daily working hours, and so on. In view of requirements from the ecological and environmental protection, the need for the water delivery pipe to cross the pavement 13, and the infiltration parts, the water delivery pipe 3 is a metal-plastic composite pipe, such as a steel-plastic composite pipe or an aluminum-plastic composite pipe, or the water delivery pipe 3 is a plastic pipe, such as a PB plastic pipe.

Considering that an upper half of the waterside slope 4 of the levee 14 is higher, the leaching and desalinating can still be performed by the collected natural rainwater when the water pump 2 does not lift the freshwater. While a lower half of the waterside slope 4 of the levee 14 is less affected by the leaching and desalinating of the natural rainwater, and the downward water after the leaching and desalinating of the upper half of the waterside slope 4 of the levee 14 even plays an adverse effect on the lower half of the waterside slope 4 of the levee 14, that is, compared to the upper half of the waterside slope 4 of the levee 14, leaching and desalinating effect of the same amount of water from the top of the levee 14 is reduced for the lower half of the waterside slope 4 of the levee 14. Preferably, in conjunction with the practical needs, the water delivery pipe 3 is connected to each infiltration parts and each drainage infiltration channel 11 through bypass pipes, so as to improve the overall desalination effect of the levee 14, where a geotextile is provided at the mouth of each bypass pipe.

As shown in FIG. 6, the main diverting and draining channel 5 is excavated along an extension direction of the levee 14, and an infiltration drainage piece is arranged inside the main diverting and draining channel 5, preferably, the infiltration drainage piece is a PE pipe with a diameter ranging from 10 to 30 cm, and a bottom of the infiltration drainage piece is lower than a bottom of the freshwater storage tank 6 by 3-5 cm, so that the freshwater in the freshwater storage tank 6 lifted by the water pump 2 or the rainwater in the freshwater storage tank 6 can flow into the infiltration drainage piece of the main diverting and draining channel 5 due to gravity.

Infiltration hollows 7 of different sizes are provided in different infiltration parts according to the types of greenery to be planted subsequently. When planting trees 9, a depth of the corresponding infiltration hollow 7 is 70 cm, and a length and a width of the infiltration hollow 7 are 60 cm; when planting shrubs 10, the depth of the corresponding infiltration hollow 7 is 50 cm, and the length and the width of the infiltration hollow 7 is 40 cm. A top edge of each of the infiltration hollows 7 is located on a slope surface of the waterside slope 4, and soil is piled upwardly or a water-guiding board is arranged at a lower side of the top edge of the infiltration hollow 7, so as to form an infiltration area, preferably, a height of the piled-up soil is 15 cm.

A bottom of each infiltration hollow 7 may be covered by a layer of gravel 8 with a thickness of 3 cm, where a diameter of the gravel 8 ranges from 1 to 10 cm, so that through the gaps and pores between the gravel 8, the natural rainfall and the freshwater lifted by the lifting the pump 2 can infiltrate into the sand at the bottom of the infiltration hollow 7, in addition, the gravel 8 can play a role in enhancing the stability of slopes and preventing the sand from forming a vertical salt uprise route.

Alternatively, the infiltration drainage piece is inserted at the bottom of the infiltration hollow 7 or a drainage panel 16 for increasing the pore size of the sandy soil at the bottom of the infiltration hollow 7 is inserted, in this way, the infiltration and desalination effect of the naturally occurring rainwater as well as the freshwater lifted by the water pump 2 is magnified several times by increasing the pore size of the sandy soil at the bottom of the infiltration hollow 7.

Figure 8:
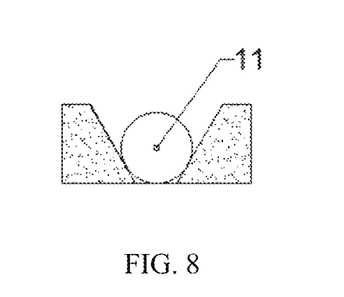
FIG. 8 shows a cross-section of a drainage infiltration channel of FIG. 6.

As shown in FIG. 6, an inclined angle of those drainage infiltration channels 11 away from the river 1 is smaller than that of the waterside slope 4, so that a flow rate of the freshwater or the rainwater can be reduced, which weakens the scouring and eroding intensity to the slopes, and enables the freshwater or the rainwater to carry out effective underground infiltration, thus driving the salts in the bottom of the channel and in the surrounding soils to be discharged along with the flow of the water, and reducing the salts in the surrounding soils. The deeper each drainage infiltration channel 11 is buried, the greater the infiltration influence of the freshwater or the rainwater within the drainage infiltration channel 11, allowing the distance between adjacent drainage infiltration channels 11 to be increased. The drainage infiltration channels 11 are located on the slope of the levee 14, and in conjunction with the planting spacing requirements of the trees 9 or shrubs 10 of the landscaping, excavation of the natural slopes to form the drainage infiltration channels 11 is recommended, and preferably, a width of a channel opening of each drainage infiltration channel 11 ranges from 0.3 to 0.5 m, and a depth of each drainage infiltration channel 11 is 0.3 m, as shown in FIG. 8.

A volume of the freshwater storage tank 6 is a total of the maximum rainfall runoff in three days or one water lifting which meets the demand for one day's flow. Except for the volume of the freshwater storage tank 6, the volume of the main diverting and draining channel 5 and the drainage infiltration channels 11 can also be taken into consideration. Preferably, the top of the levee 14 is provided with one freshwater storage tank 6 having a depth of 70 cm and a width of 60 cm, where the length can be determined according to the volume requirements; alternatively, the top of the levee 14 is provided with multiple identical freshwater storage tanks 6, where the depth of each freshwater storage tank 6 is 70 cm, and the length and width of each freshwater storage tank 6 are 70 cm, and adjacent freshwater storage tanks 6 are connected by the main diverting and draining channel 5. Preferably, the side walls of the one or more freshwater storage tanks 6 are provided with impermeable layers within a certain height range.

A construction method for leaching and desalinating sandy soil in estuarine land reclaimed by sand blowing and planting greenery includes the following: step S1: construction for leaching and desalination, and step S2: construction for greenery planting, where the construction for leaching and desalination forms the leaching and desalinating system for sandy soil in estuarine land reclaimed by sand blowing before planting greenery as described above.

Figure 1:
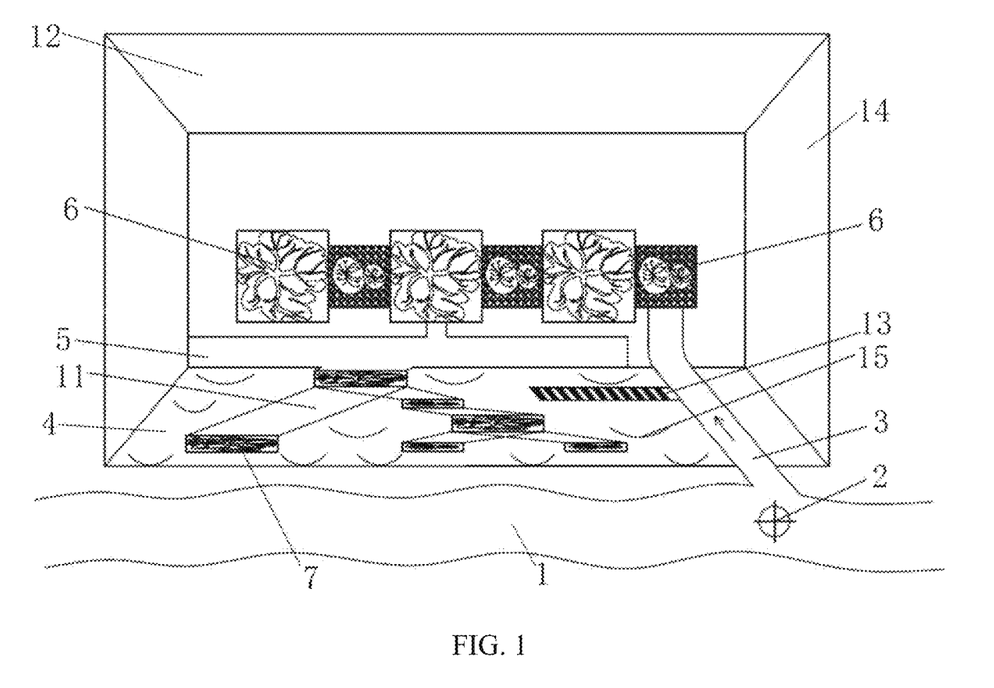
FIG. 1 shows a schematic structural diagram of a leaching and desalinating system for sandy soil in estuarine land reclaimed by sand blowing before planting greenery that is formed during construction according to the present disclosure.

Step S1 specifically includes the following substeps:

S1-1, forming a freshwater storage tank (6) by excavation at a top of a levee (14) formed by blowing sand, then forming a main diverting and draining channel (5) connected to the freshwater storage tank (6) by excavation;

S1-2, forming multiple drainage infiltration channels (11) by excavation on a waterside slope (4) of the levee (14), and forming multiple infiltration hollows (7) by excavation, where each two neighboring infiltration hollows (7) are connected to each other by one drainage infiltration channel (11), and those of the infiltration hollows (7) closer to the main diverting and draining channel (5) are connected to the main diverting and draining channel (5);

S1-3, installing a water pump and pipe assembly in a river (1) for lifting the freshwater in the river (1) through a water delivery pipe (3) into the freshwater storage tank (6), preferably the water pump and pipe assembly includes a water pump 2, and the water pump 2 is a permanent or temporary water pump;

the leaching and desalinating system for sandy soil in estuarine land reclaimed by sand blowing before planting greenery formed during the construction for leaching and desalination is shown in FIG. 1.

Step S2 includes after leaching and desalination of sandy soil of the levee (14) by using the leaching and desalinating system formed during the construction for leaching and desalination, planting greenery in the infiltration hollows (7) and the freshwater storage tank (6) and constructing a rainwater channel at the top of the levee (14).

In the present disclosure, before the construction for leaching and desalination, a spraying device is connected to the water pump 2 to perform an artificial rainfall-like spraying on the whole project area of the levee 14, so that a protection and isolation layer can be formed on the wet sand surface, facilitating the construction of the freshwater storage tank 6 and infiltration hollows 7 and preventing dust.

Step S1-1 includes the following: determining the positions of multiple freshwater storage tanks (6) at the top of the levee (14) according to the subsequent greenery planting layout, excavating multiple freshwater storage tanks (6) with different sizes according to the different varieties of the to-be-planted greenery, arranging multiple freshwater storage tanks (6) side by side in series along an extension direction of the levee (14), excavating the main diverting and draining channel (5) at the top of the levee (14) near the waterside slope (4) along the extension direction of the levee (14), and then connecting the main diverting and draining channel (5) to one of the multiple freshwater storage tanks (6).

Preferably, if trees 9 are to be planted in the freshwater storage tanks 6 during the construction for greenery planting, the depth of the freshwater storage tanks 6 during the construction for leaching and desalination is 70 cm, and the length and width are both 60 cm; if shrubs 10 are to be planted in the freshwater storage tanks 6 during the construction for greenery planting, the depth of the freshwater storage tanks 6 during the construction for leaching and desalination is 50 cm, and the length and width are both 40 cm; where the freshwater storage tanks 6 is manually or mechanically excavated.

Preferably, the water level in the freshwater storage tanks 6 rises when the water pump is working, and the freshwater enters the main diverting and draining channel 5 by overflow and gravity, and the freshwater stored in the freshwater storage tanks 6 plays a role in water level regulation and infiltration when the pump is not working. According to the actual demand, anti-seepage treatment can be carried out within a certain height range on the side walls of the freshwater storage tanks 6.

In step S1-1, if the main diverting and draining channel (5) coincides with and matches the rainwater channel in size, wherein the rainwater channel is constructed at the top of the levee (14) during the construction for greenery planting, the depth of the main diverting and draining channel (5) and a width of the opening of the main diverting and draining channel (5) are set to reach the design requirements, and preferably the design depth of the main diverting and draining channel 5 ranges from 15-20 cm, and the design width of the opening ranges from 20-30 cm.

In step S2, anti-seepage treatment is performed on the main diverting and draining channel 5, which is excavated during the construction for leaching and desalination, to facilitate the construction of the rainwater channel.

Or in step S1-1, if the main diverting and draining channel (5) does not coincide with and match the rainwater channel in size, the depth of the main diverting and draining channel (5) and the width of the openings of the main diverting and draining channel (5) are not set to reach the above design requirements (smaller than design values, for example), where the side walls and the bottom of the main diverting and draining channel (5) perform a temporary function of infiltration, leaching and desalination, and ensuring order flow of freshwater.

In step S2, the rainwater channel is reconstructed at the top of the levee 14 based on a set position of the rainwater channel.

In step S1-2, the excavation location of multiple infiltration hollows (7) on the waterward slope (4) is determined according to the construction for greenery planting, infiltration hollows (7) of different sizes are excavated according to the varieties of the greenery to be planted therein during the construction for greenery planting, and multiple infiltration hollows (7) are excavated sequentially in a direction from the bottom to the top of the levee.

Multiple drainage infiltration channels 11 are excavated sequentially in a direction from the top to the bottom of the levee, where the freshwater and rainwater in the drainage infiltration channels 11 can facilitate salts in the bottom and surrounding of the channels to be washed out and flow down with the water, thus reducing the salt content in the surrounding soil. The drainage infiltration channels 11, which serve as watering channels at the start of the construction for greenery planting and during the subsequent operation and maintenance period, can reduce the influence scope of the activity of the operating personnel and the intensity of labor. Due to low construction disturbance, the drainage infiltration channels 11 can be formed through one or two times of excavation as needed.

Multiple scale ripples are also provided on the waterside slope (4), and the sand excavated from each scale ripple is piled up at a lower edge of the scale ripple to form a sand barricade (15), preferably, a height of the sand barricade 15 is 15 cm, where the sand barricade 15 is able to intercept the rainwater on the slope surface, strengthen the infiltration, and perform desalination on the sand. A pavement 13 is also provided on the waterside slope 4, where the pavement 13 is elevated or paved on the waterside slope 4. The drainage infiltration channels 11 are arranged below the pavement 13 or stepping stones are used to overcome the intersection of the drainage infiltration channels 11 and the pavement 13 and to ensure that the drainage infiltration channels 11 and the pavement 13 function respectively.

In step S1-3, the water delivery pipe 3 is arranged on the surface of the waterside slope 4, or a pipe trench is excavated on the waterside slope 4 and the water delivery pipe 3 is buried in this pipe trench to reduce maintenance. Considering that there may be an intersection between the infiltration hollows 7 and the pipe trench, the pipe trench for the water delivery pipe 3 is recommended to be formed through one excavation. Or the water delivery pipe 3 is connected to multiple infiltration hollows 7 and drainage infiltration channels 11 via multiple bypass pipes, and one geotextile is provided at the mouth of each bypass pipe to realize local scouring and protection, where the pump and the water delivery pipe 3 can cooperate with the drainage infiltration channels 11 to water the green plants in the infiltration hollows 7 during the construction for greenery planting.

Figure 4:
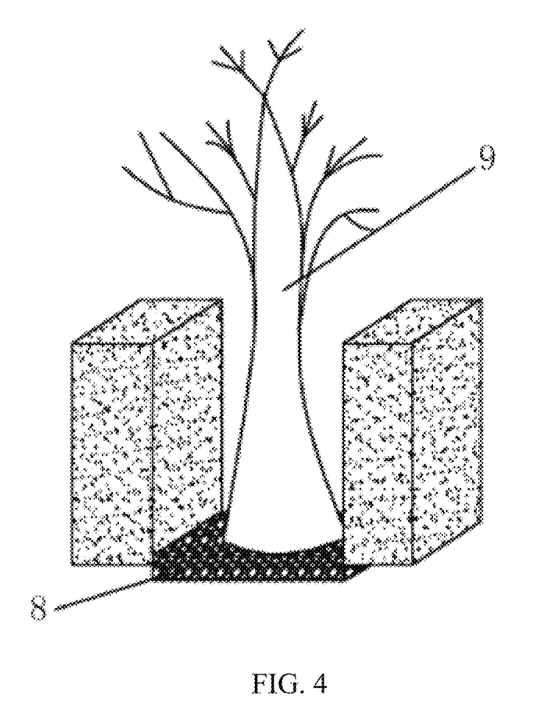
FIG. 4 shows a schematic structural diagram of a freshwater storage tank or an infiltration hollow into which a tree with lateral root growth is planted during the greening planting period.
Figure 5:
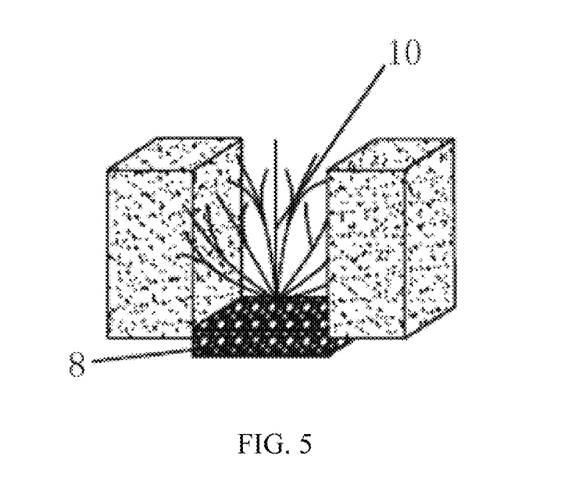
FIG. 5 shows a schematic structural diagram of a freshwater storage tank or an infiltration hollow into which a shrub with lateral root growth is planted during the greening planting period.

If trees 9 or shrubs 10 with lateral root growth are planted in the freshwater storage tanks (6) or infiltration hollows (7) during the construction for greenery planting, the freshwater storage tanks (6) or infiltration hollows (7) are excavated to a first set depth and then to a second set depth during the construction for leaching and desalination, gravels (8) are provided within the height difference between the first set depth and the second set depth. As shown in FIGS. 4 and 5, natural rainwater as well as the freshwater lifted by the water pump can flow down into the sandy soil at the bottom of the freshwater storage tanks (6) or infiltration hollows 7 via the gaps and pores between the gravels 8, in addition, the gravels 8 can play a role in preventing the sand from forming a vertical salt uprise route.

Figure 2:
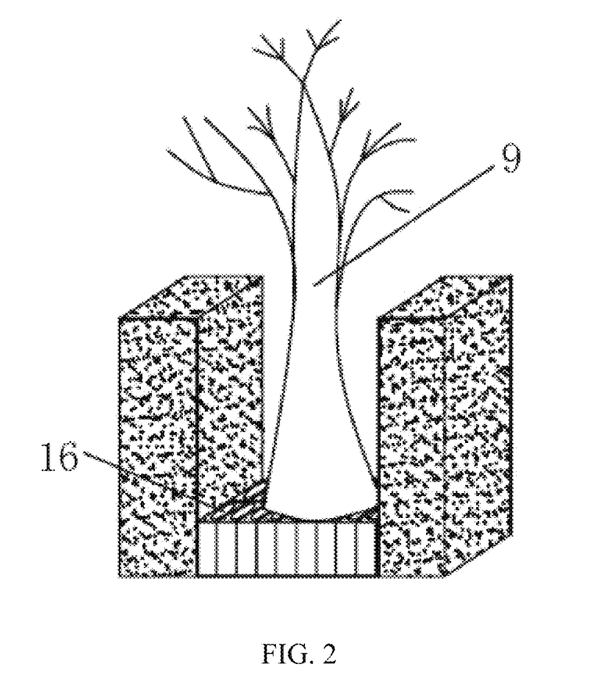
FIG. 2 shows a schematic structural diagram of a freshwater storage tank or an infiltration hollow into which a tree with longitudinal root growth is planted during a greening planting period.
Figure 3:
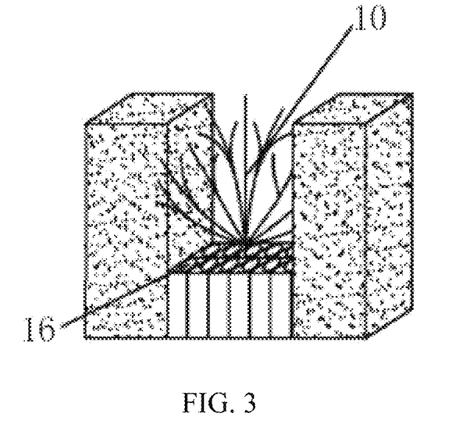
FIG. 3 shows a schematic structural diagram of a freshwater storage tank or an infiltration hollow into which a shrub with longitudinal root growth is planted during the greening planting period.

If trees 9 or shrubs 10 with longitudinal root growth are planted in the freshwater storage tanks (6) or infiltration hollows (7) during the construction for greenery planting, the freshwater storage tanks (6) or infiltration hollows (7) are excavated to a set depth during the construction for leaching and desalination, and then drainage panels (16) are buried at the bottom of the freshwater storage tanks (6) or infiltration hollows (7). As shown in FIGS. 2 and 3, the drainage panels (16) increase a pore size of the sandy soil at the bottom of the freshwater storage tanks (6) or infiltration hollows (7), to magnify the infiltration and desalination effect of the naturally falling rainwater and the freshwater lifted by the pump, which allows trees 9 or shrubs 10 with longitudinal root growth planted in the freshwater storage tanks (6) or infiltration hollows (7) to grow well during the construction for greenery planting.

In summary, the gravel 8 and the drainage panel 16 enhance and safeguard the infiltration effect of the freshwater or rainwater, and reduce the maintenance work at a later stage.

Since the infiltration hollows 7 are arranged on the surface of the waterside slope 4, they are recommended to be once-forming (i.e., formed through one excavation). Suspension operations of construction machinery as well as manpower that utilizes the pavement 13 on the waterside slope 4 can be used to provide the gravel 8 or the drainage panel 16 at the bottom of the infiltration hollow 7, so as to minimize the impacts on the construction operation area and the surrounding area.

A height of the drainage panel 16 inserted at the bottom of the freshwater storage tank 6 ranges from 15 to 20 cm.

In step S2, during the construction for greenery planting, the infiltration hollows (7) are first filled with planting soil, then the planting soil is compacted, and corresponding varieties of greenery are planted in the infiltration hollows (7) according to different treatments at the bottom of the infiltration hollows (7). Some of the scale ripples are filled with humus soil in which seeds can be sowed or lawn can be transplanted. The gaps between the stones of the pavement (13) can be provided with herbaceous green plants. The freshwater storage tanks (6) are first filled with planting soil, then the planting soil is compacted, and corresponding varieties of greenery are planted in the freshwater storage tank (7) according to different treatments at the bottom of the freshwater storage tanks (6). The planting for the infiltration hollows (7) and some of the scale ripples is carried out sequentially from the bottom to the top of the levee. In addition to playing a role in intercepting rainwater from slopes and strengthening the infiltration, the other ones of the scale ripples (i.e., those not filled with humus soil) also play a role in collecting litterfall of the plants on the slope and the like. After years of sedimentation, the scale ripples will eventually merge with the surrounding area.

A method for leaching and desalinating sandy soil in estuarine land reclaimed by sand blowing before planting greenery, which uses the above mentioned leaching and desalinating system for sandy soil in estuarine land reclaimed by sand blowing before planting greenery, includes the following:

(1) a water pump and pipe assembly is turned on to lift the freshwater in a river 1 to a freshwater storage tank 6 through a water delivery pipe 3, where the freshwater in the freshwater storage tank 6 flows to a main diverting and draining channel 5 by gravity, then flows to infiltration parts through a first set of drainage infiltration channels 11 by gravity, finally flows to the river 1 through a second set of drainage infiltration channels 11; where sandy soil in each of the infiltration parts is rapidly desalted by the freshwater; and (2) rainwater falls into the freshwater storage tank 6 and the main diverting and draining channel 5, where the rainwater in the freshwater storage tank 6 flows to the main diverting and draining channel 5 by gravity, and then flows to the infiltration parts through the first set of drainage infiltration channels 11 by gravity, finally flows to the river 1 through the second set of drainage infiltration channels 11; where sandy soil in each infiltration parts is rapidly desalted by the rainwater.

The freshwater storage tank 6, the main diverting and draining channel 5, the infiltration part, and the drainage infiltration channel 11 of the present disclosure can intercept the natural rainfall, therefore, compared with the natural slope without treatment, the present disclosure can effectively utilize the infiltration amount of the rainfall to improve the sand oil desalination efficiency to the levee 14. On the other hand, the freshwater in the river 1 can be lifted through the water pump 2 to the freshwater storage tank 6 at the top of the levee 14, and can flow due to gravity, therefore, compared with conventional surface spraying, erosion ditches are less prone to be formed, no manual movement and spraying intensity control is needed. In addition, in the present invention, the freshwater or rainwater in the freshwater storage tank 6 flows along a designated route, allowing the salts in the surface soil along the designated route to infiltrate deeper to realize the purpose of desalinization. The present disclosure focuses on the leaching and desalinating of sandy soil in the freshwater storage tank and infiltration part, where the freshwater storage tank and infiltration parts are for planting greenery. The arrangement of the freshwater storage tank 6, the main diverting and draining channel 5, the infiltration part, and the drainage infiltration channel 11 increases the vertical infiltration rate and enlarges the infiltration area, and there is no mandatory waterproofing requirement for the main diverting and draining channel 5 and the drainage infiltration channel 11, allowing for desalination effect both in a vertical direction and a transverse direction, and the desalination effect in particular is better.

The present disclosure can quickly desalinate the sandy soil in land reclaimed by sand blowing at a low cost, improve the physicochemical properties of the soil, and provide a basic guarantee for the subsequent greenery planting on the sandy soil in land reclaimed by sand blowing, moreover, has the advantages of simple structure, low cost of construction, convenient construction, and easy maintenance, which reflects the concept of ecological and environmental protection and has a wide range of applicability.

The lower end of the waterside slope 4 of the levee 14 is connected to the river 1 through the revetment. The river 1 collects runoff from the surface of the waterside slope 4 or the freshwater with a certain concentration of salt that naturally flows into the river 1. If the flow of the river is poor for an extended period, water evaporation will cause salt enrichment, resulting in high salinity during certain times. Therefore, it is important to closely monitor the water in the river during those times to ensure the effectiveness of the freshwater.

The present disclosure can be organically combined with the subsequent greenery planting project, the areas in which greenery is planted, such as the freshwater storage tank 6 and infiltration hollows 7, are washed and desalted during the construction for leaching and desalination, which can reduce the salinity of the greenery planting areas, thus facilitating the plant growth, increasing the plant survival rates, and forming good planting areas. Compared with the traditional construction method where the construction for leaching and desalination and the construction for greenery planting are separate, the present disclosure considers the construction for leaching and desalination and the construction for greenery planting as a whole, having obvious advantages in the length of the total construction period, project progress, and cost control. The present disclosure comprehensively takes into consideration the on-site construction difficulty, construction convenience, construction progress, construction funds, and other factors, therefore, the present disclosure has wide applicability, and minimal disturbance during the construction for greenery planting, which is conducive to steady improvements of the physical and chemical properties of the soil in the planting areas and ensures good greening effect.

The foregoing are only preferred embodiments of the present disclosure, and it should be noted that for a person of ordinary skill in the art, a number of improvements and substitutions can be made without departing from the technical principles of the present disclosure, and these improvements and substitutions should also be regarded as within the protection scope of the present disclosure.

The invention claimed is:

1. A leaching and desalinating system for sandy soil in estuarine land reclaimed by sand blowing before planting greenery, comprising a levee (14) formed by sand blowing and located on a side of a river (1), wherein a slope of the levee (14) closer to the river (1) is a waterside slope (4), and the other slope of the levee (14) is a landside slope (12);

wherein the leaching and desalinating system comprises a water pump and pipe assembly arranged in the river (1), a freshwater storage tank (6), and a main diverting and draining channel (5) arranged at a top of the levee (14);

wherein the water pump and pipe assembly is configured to lift freshwater from the river (1) to the freshwater storage tank (6) through a water delivery pipe (3), a plurality of infiltration parts in which greenery are planted are provided on the waterside slope (4), the plurality of infiltration parts are connected to each other via a plurality of drainage infiltration channels (11); wherein, of the plurality of drainage infiltration channels (11), those closer to the main diverting and draining channel (5) are connected to the main diverting and draining channel (5), and those closer to the river (1) are connected to the river (1).

2. The leaching and desalinating system for sandy soil in estuarine land reclaimed by sand blowing before planting greenery according to claim 1, wherein the water delivery pipe (3) is arranged along a surface of the waterside slope (4), or the water delivery pipe (3) is buried in an excavated pipe trench in the levee (14).

3. The leaching and desalinating system for sandy soil in estuarine land reclaimed by sand blowing before planting greenery according to claim 2, wherein the water delivery pipe (3) is connected to the plurality of infiltration parts and the plurality of drainage infiltration channels (11) through a plurality of bypass pipes, and a mouth of each of the plurality of bypass pipes is provided with a geotextile.

4. The leaching and desalinating system for sandy soil in estuarine land reclaimed by sand blowing before planting greenery according to claim 1, wherein the main diverting and draining channel (5) is excavated along an extension direction of the levee (14), an infiltration drainage piece is arranged inside the main diverting and draining channel (5), and a bottom of the infiltration drainage piece is lower than a bottom of the freshwater storage tank (6).

5. The leaching and desalinating system for sandy soil in estuarine land reclaimed by sand blowing before planting greenery according to claim 1, wherein a plurality of infiltration hollows (7) with different sizes are formed in the plurality of infiltration parts according to the types of greenery to be planted subsequently, a bottom of each of the plurality of infiltration hollows (7) is covered by a layer of gravel (8), or a bottom of each of the plurality of infiltration hollows (7) is inserted with an infiltration drainage piece or a drainage panel (16) for increasing a pore size of the sandy soil.

6. The leaching and desalinating system for sandy soil in estuarine land reclaimed by sand blowing before planting greenery according to claim 5, wherein a top edge of each of the plurality of infiltration hollows (7) is located on a slope surface of the waterside slope (4), and soil is piled upwardly or a water-guiding board is arranged at a lower side of the top edge of each of the plurality of infiltration hollows (7), so as to form an infiltration area.

7. The leaching and desalinating system for sandy soil in estuarine land reclaimed by sand blowing before planting greenery according to claim 1, wherein an inclined angle of some of the plurality of drainage infiltration channels (11) away from the river (1) is smaller than that of the waterside slope (4).

8. The leaching and desalinating system for sandy soil in estuarine land reclaimed by sand blowing before planting greenery according to claim 1, wherein side walls of the freshwater storage tank (6) are provided with impermeable layers within a certain height range; the water pump and pipe assembly includes a water pump (2), a pump head of the water pump (2) is below a water surface of the river (1) and on a side of the river (1) away from the levee (14); and the waterside slope (4) is provided with a pavement (13).

9. A construction method for leaching and desalinating sandy soil in estuarine land reclaimed by sand blowing and planting greenery, comprising: S1 construction for leaching and desalination; and S2 construction for greenery planting, wherein the construction for the leaching and desalinating forms the leaching and desalinating system for sandy soil in estuarine land reclaimed by sand blowing before planting greenery according to claim 1,
wherein S1 comprises:
S1-1 forming a plurality of freshwater storage tanks (6) by excavation at a top of a levee (14) formed by blowing sand, then forming a main diverting and draining channel (5) connected to the plurality of freshwater storage tanks (6) by excavation;
S1-2 forming a plurality of drainage infiltration channels (11) by excavation on a waterside slope (4) of the levee (14), and forming a plurality of infiltration hollows (7) by excavation, wherein the plurality of infiltration hollows (7) are connected to each other by the plurality of drainage infiltration channels (11), and those of the plurality of infiltration hollows (7) closer to the main diverting and draining channel (5) are connected to the main diverting and draining channel (5);
S1-3 installing a water pump and pipe assembly in a river (1) for lifting freshwater in the river (1) through a water delivery pipe (3) into the plurality of freshwater storage tanks (6); and
S2 performing leaching and desalinating on sandy soil of the levee (14) using the leaching and desalinating system formed in the construction for leaching and desalination, and planting greenery in the plurality of infiltration hollows (7) and the plurality of freshwater storage tanks (6).

10. The construction method for leaching and desalinating sandy soil in estuarine land reclaimed by sand blowing and planting greenery according to claim 9, wherein step S1-1 comprises: determining positions of the plurality of freshwater storage tanks (6) at the top of the levee (14) according to a subsequent greenery planting layout, excavating the plurality of freshwater storage tanks (6) with different sizes according to different varieties of to-be-planted greenery, arranging the plurality of freshwater storage tanks (6) in series along an extension direction of the levee (14), excavating the main diverting and draining channel (5) at the top of the levee (14) near the waterside slope (4) along the extension direction of the levee (14), and then connecting the main diverting and draining channel (5) to one of the plurality of freshwater storage tanks (6).

11. The construction method for leaching and desalinating sandy soil in estuarine land reclaimed by sand blowing and planting greenery according to claim 10, wherein in step S1-1, the plurality of freshwater storage tanks (6) are arranged side by side along the extension direction of the levee (14), if the main diverting and draining channel (5) coincides with and matches a rainwater channel in size, wherein the rainwater channel is constructed at the top of the levee (14) during the construction for greenery planting, a depth of the main diverting and draining channel (5) and a width of the opening of the main diverting and draining channel (5) are set to design values, if the main diverting and draining channel (5) does not coincide with and match the rainwater channel in size, the depth of the main diverting and draining channel (5) and the width of the openings of the main diverting and draining channel (5) are not set to design values.

12. The construction method for leaching and desalinating sandy soil in estuarine land reclaimed by sand blowing and planting greenery according to claim 9, wherein in step S1-2, the plurality of drainage infiltration channels 11 are excavated sequentially in a direction from the top to the bottom of the levee (14), excavation locations of the plurality of infiltration hollows (7) on the waterside slope (4) are determined according to a subsequent greenery planting layout, the plurality of infiltration hollows (7) with different sizes are excavated according to the varieties of the greenery to be planted therein during the construction for greenery planting, and the plurality of infiltration hollows (7) are excavated sequentially in a direction from the bottom to the top of the levee (14).

13. The construction method for leaching and desalinating sandy soil in estuarine land reclaimed by sand blowing and planting greenery according to claim 9, wherein
    if greenery with lateral root growth is planted in the plurality of freshwater storage tanks (6) or the plurality of infiltration hollows (7) during the construction for greenery planting, the plurality of freshwater storage tanks (6) or the plurality of infiltration hollows (7) are excavated to a first set depth, and then to a second set depth during the construction for leaching and desalination, gravels (8) are provided within the height difference between the first set depth and the second set depth;
    if greenery with longitudinal root growth is planted in the plurality of freshwater storage tanks (6) or the plurality of infiltration hollows (7) during the construction for greenery planting, the plurality of freshwater storage tanks (6) or the plurality of infiltration hollows (7) are excavated to a set depth during the construction for leaching and desalination, and then drainage panels (16) are buried at the bottom of the plurality of freshwater storage tanks (6) or the plurality of infiltration hollows (7) to increase a pore size of the sandy soil at the bottom of the plurality of freshwater storage tanks (6) or the plurality of infiltration hollows (7).

14. The construction method for leaching and desalinating sandy soil in estuarine land reclaimed by sand blowing and planting greenery according to claim 13, wherein in step S1-2, a plurality of scale ripples are provided on the waterside slope (4), and sand excavated from each of the plurality of scale ripples is piled up at a lower edge of each of the plurality of scale ripples to form a sand barricade (15), and a pavement (13) is provided on the waterside slope (4).

15. The construction method for leaching and desalinating sandy soil in estuarine land reclaimed by sand blowing and planting greenery according to claim 14, wherein in step S2, during the construction for greenery planting, the plurality of infiltration hollows (7) are first filled with planting soil, then the planting soil is compacted, and corresponding varieties of greenery are planted in the plurality of infiltration hollows (7) according to different treatments at the bottom of the plurality of infiltration hollows (7); some of the plurality of scale ripples are filled with humus soil in which seeds are sowed or lawns are transplanted; gaps between the stones of the pavement (13) are provided with herbaceous green plants; the plurality of freshwater storage tanks (6) are first filled with planting soil, then the planting soil is compacted, and corresponding varieties of greenery are planted in the plurality of freshwater storage tanks (7) according to different treatments at the bottom of the plurality of freshwater storage tanks (6), and planting for the plurality of infiltration hollows (7) and the some of the plurality of scale ripples is carried out sequentially from the bottom to the top of the levee (14).

16. The construction method for leaching and desalinating sandy soil in estuarine land reclaimed by sand blowing and planting greenery according to claim 14, wherein
    in step S1-1, an anti-seepage treatment is carried out within a certain height range on side walls of the plurality of freshwater storage tanks (6);
    in step S1-3, a water delivery pipe (3) is connected to the plurality of infiltration hollows (7) and the plurality of drainage infiltration channels (11) via a plurality of bypass pipes, and one geotextile is provided at a mouth of each of the plurality of bypass pipe.

17. A method for leaching and desalinating sandy soil in estuarine land reclaimed by sand blowing before planting greenery, using the leaching and desalinating system for sandy soil in estuarine land reclaimed by sand blowing before planting greenery according to claim 1, comprising: using a water pump and pipe assembly in a river (1) to lift freshwater through a water delivery pipe (3) to a plurality of freshwater storage tanks (6) at a top of a levee (14), wherein the freshwater in the plurality of freshwater storage tanks (6) flows to a main diverting and draining channel (5) by gravity, then flows to a plurality of infiltration parts through a plurality of drainage infiltration channels (11) by gravity, and finally flows to the river (1), so that sandy soil in each of the plurality of infiltration parts is desalted by the freshwater; wherein the main diverting and draining channel (5) is at the top of the levee (14) and connected to the plurality of freshwater storage tanks (6); the plurality of infiltration parts are provided on a waterside slope (4), configured to accommodate greenery, and connected to each other through the plurality of drainage infiltration channels (11); of the plurality of drainage infiltration channels (11), those closer to the main diverting and draining channel (5) is connected to the main diverting and draining channel (5), and those closer to the river (1) is connected to the river (1).

18. The method for leaching and desalinating sandy soil in estuarine land reclaimed by sand blowing before planting greenery according to claim 17, wherein: rainwater fallen into the plurality of freshwater storage tanks (6) flows to the main diverting and draining channel (5) by gravity, then flows to the plurality of infiltration parts through the plurality of drainage infiltration channels (11) by gravity, and finally flows to the river (1), so that sandy soil in each of the plurality of infiltration parts is desalted by the rainwater.

* * * * *